ANALOG-DIGITAL HYBRID DIVIDER APPARATUS USING FRACTIONAL ARITHMETIC

Filed Oct. 14, 1965

INVENTOR.
DON E. AITCHISON
BY Bruce C Lutz
ATTORNEY

United States Patent Office 3,428,790

Patented Feb. 18, 1969

3,428,790

ANALOG-DIGITAL HYBRID DIVIDER APPARATUS USING FRACTIONAL ARITHMETIC

Don E. Aitchison, Duarte, Calif., assignor to Honeywell Inc., Minneapolis, Minn., a corporation of Delaware Filed Oct. 14, 1965, Ser. No. 495,974

U.S. Cl. 235—150.5 3 Claims

Int. Cl. G06j *1/02*

ABSTRACT OF THE DISCLOSURE

A hybrid divider which uses fractional arithmetic to divide one analog signal by another analog signal and which provides a digital output signal.

This invention relates generally to computing apparatus and more specifically to a divider using fractional arithmetic that is capable of accepting first and second analog input signals, and providing a digital output signal.

In the past, when it was desired to divide one analog signal by another and provide a digital output signal, it was necessary to either convert both analog signals to digital signals and perform the arithmetic digitally, or perform an analog division and then convert the analog quotient to a digital quotient. In either case analog-to-digital converters were required.

In this invention the analog signals are directly divided to provide a digital output signal without the necessity of using separate analog-to-digital converter. In other words, the conversion is accomplished by the divider itself. In this invention division is performed by forming a trial quotient, multiplying the trial quotient times a divisor, and comparing the resultant product with a dividend. The result of the comparison determines the magnitude of a particular bit or digit.

Accordingly, it is an object of this invention to provide a divider capable of accepting two analog signals, dividing one analog signal by the other, and providing a digital output signal without the necessity of using analog-to-digital converters.

Other objects of this invention will become evident to those skilled in the art upon a reading of this specification and appended claims in conjunction with the accompanying drawings, wherein:

Figure 1:
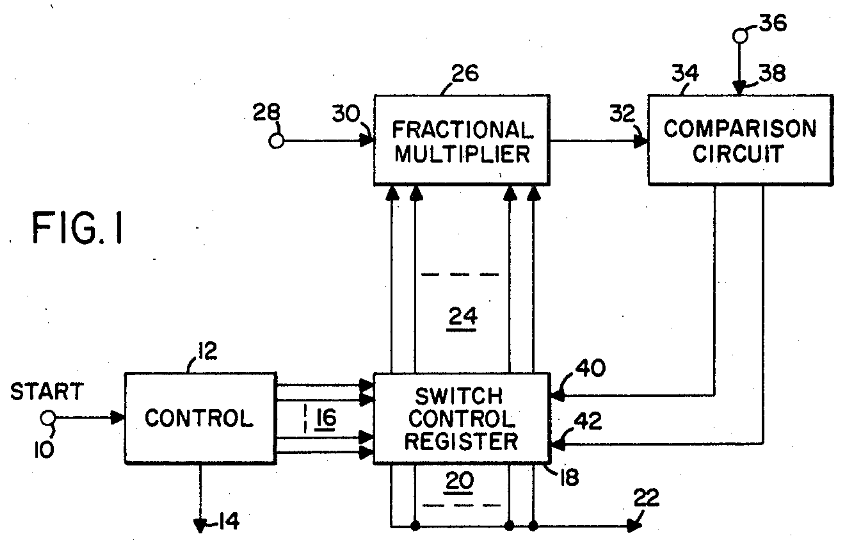
FIGURE 1 is a block diagram of one embodiment of this invention.

Referring now to FIGURE 1, there is shown a control or start input means or terminal 10 connected to an input of a control means or circuit 12 which has a first output connected to an output means or terminal 14, and a plurality of outputs connected by a plurality of lines 16 to a plurality of inputs of a control means, control register means, or switch control register 18. Switch control register 18 has a first plurality of outputs 20 connected to an output means or terminal 22 and a second plurality of outputs 24 connected to a plurality of inputs of a multiplier, multiplying means, or fractional multiplier 26.

An input means or terminal 28 is connected to an input 30 of fractional multiplier 26, the output of which is connected to an input 32 of a comparison circuit means or comparator 34. An input means or terminal 36 is connected to an input 38 of comparison circuit 34. Comparison circuit 34 provides first and second output signals connected to inputs 40 and 42, respectively, of switch control register 18.

Control 12 may be, for example, a ring counter which provides a plurality of output signals to control flip-flops or bistable devices in switch control register 18. Switch control register 18 may be a circuit similar to that shown in Susskind, Notes on Analog-Digital Conversion Techniques, Technology Press, 1957, pp. 5–30. The upper or ladder portion of the circuits shown in Susskind may be replaced by fractional multiplier 26. Fractional multiplier 26 may be of a type generally shown in FIGURE 2. Comparison circuit 34 may be similar to that shown in Electronic Equipment Engineering, March 1961, pp. 50 and 52. While the referenced circuits may be used in this invention, those skilled in the art will realize that the prior art literature shows many other circuits that may also be used.

Figure 2:
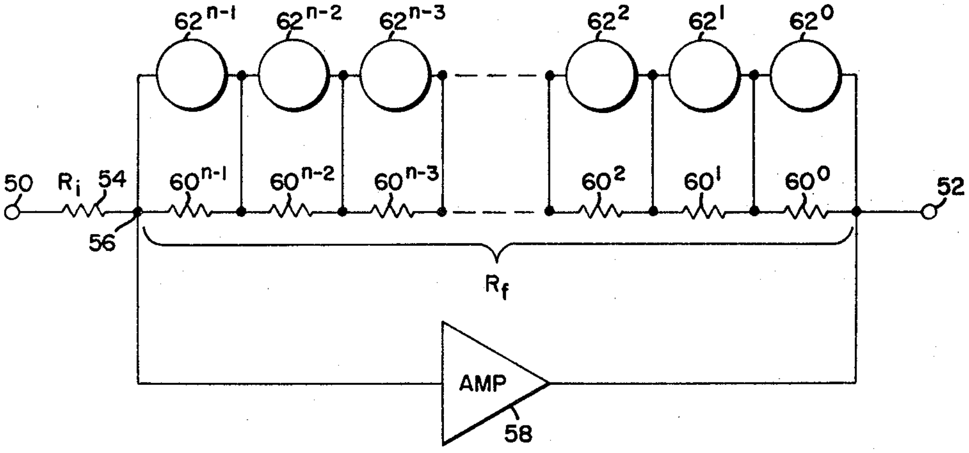
FIGURE 2 is a schematic diagram of a fractional multiplier.

In FIGURE 2 there is shown an input means or terminal 50 and an output means or terminal 52. Input terminal 50 is connected through a resistance means or resistor 54 to a terminal 56. Terminal 56 is connected to the input of an amplifier or amplifying means 58, the output of which is connected to output terminal 52.

Output terminal 52 is connected by means of a serial combination of a plurality of resistors $60^0$, $60^1$, $60^2$ . . . $60^{n-3}$, $60^{n-2}$, and $60^{n-1}$ to terminal 56. Across each of resistors 60 is connected one of a plurality of switches $62^0$, $62^1$, $62^2$ . . . $62^{n-3}$, $62^{n-2}$, and $62^{n-1}$, with each of resistors 60 being shunted by the switches 62 with the same superscript. When one of the switches 62 is open, the corresponding one of resistors 62 is connected from output terminal 52 to terminal 56 to provide feedback for amplifier 58. However, when one of switches 62 is closed, the corresponding one of resistors 60 is removed from the circuit.

Amplifier 58 of FIGURE 2 is essentially an operational amplifier. The system equation of FIGURE 2 is given by $$e_o = \frac{-(R_t/R_i)e_i}{1+(1+R_t/R_i)/K} \qquad (1)$$

where $e_o$ is the output voltage at terminal 52, $e_i$ is the input voltage at terminal 50, $R_i$ is the resistance of resistor 54, $R_t$ is the total resistance of resistors 60, and K is the amplification factor of amplifier 58. The phase reversal in amplifier 58 is taken into account in comparison circuit 34. If K is much larger than $R_t/R_i$, Equation 1 reduces to $$e_o = -(R_t/R_i)e_i \qquad (2)$$

If the circuit of FIGURE 2 is to be used in a binary divider, each of resistors 60 has a resistance, times a power of 2, where the power is equal to the superscript attached to the number 60. Thus, R is the resistance of resistor $60^0$. The resistance of resistor 54 would be $$R_i = 2^n R \qquad (3)$$

Of course, the relationships between resistors 54 and 60 could be used for number bases other than 2. FIGURE 2 could also be used for binary coded decimal systems in which the resistance values of resistors 60 would be arranged to correspond to binary coded decimal notation.

To understand the operation of FIGURE 1, assume that an analog divisor is applied to terminal 28 and an analog dividend is applied to terminal 36. Input 30 of fractional multiplier 26 corresponds to input terminal 50 of FIGURE 2 so that the signal applied to terminal 28 is $e_i$. The signal applied to input 32 of comparison circuit 34 is then $-e_o$. A signal applied at the start input terminal 10 starts control 12. Control 12 provides signals to switch control register 18 to energize the most significant bit location of switch control register 18. The output signal from switch control register 18 opens switch 62$^{n-1}$ and closes all of the remaining switches 62. Thus, the operational amplifier of FIGURE 2 provides an output signal at terminal 52 which is $$e_o=-\frac{R_f}{R_i}e_i=-\frac{2^{n-1}R}{2^nR}e_i=-\tfrac{1}{2}e_i \quad (4)$$

Since $e_i$ is the divisor, comparison circuit 34 compares ½ of the divisor with the dividend. If ½ of the divisor is greater than the dividend, comparison circuit 34 provides an output signal to input 40 of switch control register 18 setting the most significant bit location of switch control register 18 to "0." Thus, switch 62$^{n-1}$ is closed and switch 62$^{n-2}$ is opened. Now the output signal from terminal 52 of FIGURE 2 is $$e_o=-\frac{2^{n-2}R}{2^nR}e_i=-\tfrac{1}{4}e_i \quad (5)$$

If, during the first comparison, ½ of the divisor is less than the dividend, the most significant bit location of switch control register 18 is set to "1" by a signal from comparison circuit 34 applied to terminal 42. When the most significant bit location of register 18 is "1," switch 62$^{n-1}$ is held open. During the next comparison, switch 62$^{n-2}$ is opened and signal provided at terminal 52 of FIGURE 2 is:

$$e_o=\frac{-(2^{n-1}+2^{n-2})R}{2^nR}e_i=-\tfrac{3}{4}e_i \quad (6)$$

In either case, the second bit location of switch control register 18 is set during the second comparison. The above-described operation continues until each of the locations in switch control register 18 is set.

This invention is particularly adapted to performing fractional arithmetic wherein the divisor is larger than the dividend. However, either the divisor or the dividend or both may be scaled, for example, by a resistor-divider network and a corresponding scale factor may be attached to the output signal from switch control register 18. However, the signal applied at terminal 28 should be less than the signal applied at terminal 36. After all of the locations of switch control register 18 are set, control 12 provides a signal at output terminal 14 indicating that the division process is complete. The digital output signal corresponding to the quotient is then provided at output terminal 22 by switch control register 18.

While I have shown and described a particular embodiment of my invention, I do not wish to be limited by the particular circuits shown but only by the scope of the appended claims.

I claim as my invention:

1. A divider comprising, in combination:

first input means for supplying a first input signal;

multiplying means, connected to said first input means, for providing an output signal indicative of said first input signal multiplied by a fraction, said multiplying means including an operational amplifier means having resistive feedback means including *n* resistors, and *n* switch means connected in parallel one with each of said resistors;

second input means for supplying a second input signal;

comparison means, connected to said multiplying means and to said second input means, for providing an output signal indicative of the larger of said second input signal and said output signal from said multiplying means;

control means, connected to said comparison means, for providing signals in response to said output signal from said comparison means;

means connecting said switch means to said control means whereby said signals from said control means selectively operate said switch means; and output means connected to said control means for providing a digital output indication of said second input signal divided by said first input signal.

2. A divider as defined in claim 1 wherein said control means includes a control register to provide said signals to said multiplying means, said control register further providing said output indication of said second input signal divided by said first input signal.

3. A divider as defined in claim 2 wherein a successive one of said switch means is opened in response to a signal from said control register after a preceding comparison, the switch that is opened remaining open if said output signal from said multiplying means is not greater than said second input signal and the switch that is opened being closed if said output signal from said multiplying means is greater than said second input signal.

References Cited

UNITED STATES PATENTS 3,194,950 7/1965 Walls et al. ------ 235—196 XR

MARTIN P. HARTMAN, *Primary Examiner.*

U.S. Cl. X.R.

235—196